(12) United States Patent
Binhussain et al.

(10) Patent No.: US 8,992,681 B2
(45) Date of Patent: Mar. 31, 2015

(54) COMPOSITION FOR CONSTRUCTION MATERIALS MANUFACTURING AND THE METHOD OF ITS PRODUCTION

(71) Applicants: Mohammed A. Binhussain, Riyadh (SA); Turki Saud Mohammed Al-Saud, Riyadh (SA); Siarhei Zhdanok, Minsk (BY); Andrei Krauklis, Minsk (BY); Petr Samtsou, Minsk (BY); Eduard Batsianouski, Minsk (BY)

(72) Inventors: Mohammed A. Binhussain, Riyadh (SA); Turki Saud Mohammed Al-Saud, Riyadh (SA); Siarhei Zhdanok, Minsk (BY); Andrei Krauklis, Minsk (BY); Petr Samtsou, Minsk (BY); Eduard Batsianouski, Minsk (BY)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 14/156,486

(22) Filed: Jan. 16, 2014

(65) Prior Publication Data
US 2014/0123880 A1 May 8, 2014

Related U.S. Application Data

(62) Division of application No. 13/287,082, filed on Nov. 1, 2011, now Pat. No. 8,871,019.

(51) Int. Cl.
*C04B 14/06* (2006.01)
*C04B 28/04* (2006.01)
(Continued)

(52) U.S. Cl.
CPC ............... *C04B 28/04* (2013.01); *C04B 28/02* (2013.01); *B82Y 30/00* (2013.01); *Y10S 977/742* (2013.01); *Y10S 977/773* (2013.01)

USPC .......... 106/717; 106/644; 977/742; 977/773; 252/502; 977/742

(58) Field of Classification Search
CPC .. C04B 14/022; C04B 14/024; C04B 14/026; C04B 14/06; C04B 14/386; C04B 20/008; C04B 2103/30; C04B 28/04
USPC ............ 106/717, 644; 977/742, 773; 252/502
See application file for complete search history.

(56) References Cited

U.S. PATENT DOCUMENTS 3,169,940 A 2/1965 Zutty
3,382,209 A 5/1968 George
(Continued)

FOREIGN PATENT DOCUMENTS

CA 2809129 A1 6/2011
CN 201128990 Y 10/2008
(Continued)

OTHER PUBLICATIONS

"Multifunctional and Smart Carbon Nanotube Reinforced Cement - based Materials", by Baogau Han et al., (p. 1) http://link.springer.com/chapter/10.1007%2F978-3-642-16657-0_1.
(Continued)

*Primary Examiner* — Paul Marcantoni
(74) *Attorney, Agent, or Firm* — Raj Abhyanker, P.C.

(57) ABSTRACT

Disclosed is a system or method for efficiently manufacturing construction materials using carbon nanomaterials. In one or more embodiments, the method comprises creating a blend of carbon nanomaterials, wherein the blend of the carbon nanomaterials includes at least one of a carbon nanofiber, a carbon nanotube, a graphite nanoparticle and an amorphous carbon. The method also includes dispersing the carbon nanomaterials and adding a plasticizer and a sand to the dispersed mixture within 3 minutes. The method also includes adding at least one of water and a cement binding agent to the dispersed mixture after the plasticizer and the sand have been added.

5 Claims, 5 Drawing Sheets

(51) Int. Cl.
*C04B 28/02* (2006.01)
*B82Y 30/00* (2011.01)

(56) References Cited

U.S. PATENT DOCUMENTS

| | | |
|---|---|---|
| 3,645,929 A | 2/1972 | Normanton |
| 3,720,643 A | 3/1973 | Abu et al. |
| 3,772,232 A | 11/1973 | Hayes |
| 3,816,367 A | 6/1974 | Kostrowski et al. |
| 3,832,326 A | 8/1974 | Kuckro et al. |
| 3,865,782 A | 2/1975 | Anderson |
| 3,922,413 A | 11/1975 | Reineman |
| 3,971,756 A | 7/1976 | Bialous et al. |
| 4,038,237 A | 7/1977 | Snyder |
| 4,067,164 A | 1/1978 | McMillan |
| 4,173,561 A | 11/1979 | Tabana et al. |
| 4,229,497 A | 10/1980 | Piazza |
| 4,243,579 A | 1/1981 | Keogh |
| 4,394,471 A | 7/1983 | Keogh |
| 4,407,992 A | 10/1983 | Keogh |
| 4,430,470 A | 2/1984 | Taniguchi et al. |
| 4,472,199 A | 9/1984 | Davidovits |
| 4,477,523 A | 10/1984 | Biggs et al. |
| 4,567,214 A | 1/1986 | Ilardo |
| 4,584,333 A | 4/1986 | Prigent et al. |
| 4,642,137 A | 2/1987 | Heitzmann et al. |
| 4,721,659 A | 1/1988 | Tieckelmann et al. |
| 4,769,179 A | 9/1988 | Kato et al. |
| 4,791,160 A | 12/1988 | Kato et al. |
| 4,845,146 A | 7/1989 | Inoue et al. |
| 4,952,428 A | 8/1990 | Keogh |
| 4,986,049 A | 1/1991 | Kennedy et al. |
| 5,002,996 A | 3/1991 | Okuda et al. |
| 5,017,532 A | 5/1991 | Sonnenberg et al. |
| 5,030,282 A | 7/1991 | Matsuhashi et al. |
| 5,057,367 A | 10/1991 | Morii et al. |
| 5,091,453 A | 2/1992 | Davidson et al. |
| 5,091,608 A | 2/1992 | Gunther |
| 5,132,350 A | 7/1992 | Keogh |
| 5,186,883 A | 2/1993 | Beall, III |
| 5,262,467 A | 11/1993 | Keogh et al. |
| 5,274,017 A | 12/1993 | Pan |
| 5,286,775 A | 2/1994 | Bandyopadhyay |
| 5,296,534 A | 3/1994 | Senuma et al. |
| 5,308,572 A | 5/1994 | Hackman |
| 5,378,539 A | 1/1995 | Chen |
| 5,405,441 A | 4/1995 | Riddle |
| 5,412,012 A | 5/1995 | Horwatt et al. |
| 5,482,990 A | 1/1996 | Jow et al. |
| 5,583,172 A | 12/1996 | Imahashi et al. |
| 5,684,117 A | 11/1997 | Londa et al. |
| 5,698,323 A | 12/1997 | Keough et al. |
| 5,707,732 A | 1/1998 | Sonoda et al. |
| 5,771,649 A | 6/1998 | Zweig |
| 5,889,087 A | 3/1999 | Hayashi et al. |
| 5,908,584 A * | 6/1999 | Bennett ............... 252/502 |
| 5,916,392 A | 6/1999 | Ghanbari |
| 6,034,176 A | 3/2000 | Patel et al. |
| 6,043,312 A | 3/2000 | Fagher et al. |
| 6,187,409 B1 | 2/2001 | Mathieu |
| 6,263,629 B1 | 7/2001 | Brown, Jr. |
| 6,291,570 B1 | 9/2001 | Katsuki et al. |
| 6,329,464 B1 | 12/2001 | Duran et al. |
| 6,335,087 B1 | 1/2002 | Hourahane |
| 6,372,344 B1 | 4/2002 | Castellani et al. |
| 6,436,557 B1 | 8/2002 | Moriuchi et al. |
| 6,469,095 B1 | 10/2002 | Gareiss et al. |
| 6,476,138 B2 | 11/2002 | Sato et al. |
| 6,506,841 B2 | 1/2003 | Fomperie et al. |
| 6,515,231 B1 | 2/2003 | Strøbech et al. |
| 6,608,135 B1 | 8/2003 | Patel et al. |
| 6,667,358 B1 | 12/2003 | Aoyama |
| 6,727,302 B2 | 4/2004 | Goossens et al. |
| 6,783,702 B2 | 8/2004 | Niu et al. |
| 6,783,746 B1 | 8/2004 | Zhang et al. |
| 6,898,908 B2 | 5/2005 | Messenger et al. |
| 6,929,865 B2 | 8/2005 | Myrick |
| 7,045,474 B2 | 5/2006 | Cooper et al. |
| 7,049,251 B2 | 5/2006 | Porter |
| 7,144,941 B2 | 12/2006 | Sauerwein et al. |
| 7,183,342 B2 | 2/2007 | Miyamoto et al. |
| RE39,804 E | 9/2007 | Wu et al. |
| 7,345,242 B2 | 3/2008 | Chen |
| 7,357,907 B2 | 4/2008 | Resasco et al. |
| 7,361,430 B1 | 4/2008 | Gennett et al. |
| 7,378,040 B2 | 5/2008 | Luo et al. |
| 7,410,603 B2 | 8/2008 | Noguchi et al. |
| 7,413,474 B2 | 8/2008 | Liu et al. |
| 7,462,318 B2 | 12/2008 | Schroeder et al. |
| 7,491,883 B2 | 2/2009 | Lee et al. |
| 7,495,174 B2 | 2/2009 | Hase et al. |
| 7,504,451 B1 | 3/2009 | Brown et al. |
| 7,666,327 B1 | 2/2010 | Veedu |
| 7,667,139 B2 | 2/2010 | Nakayama et al. |
| 7,713,448 B1 | 5/2010 | Veedu |
| 7,875,211 B1 | 1/2011 | Veedu |
| 7,905,067 B2 | 3/2011 | Schiffmann et al. |
| 7,930,861 B2 | 4/2011 | Schiffmann et al. |
| 7,937,924 B2 | 5/2011 | Ke |
| 7,964,663 B2 | 6/2011 | Gau et al. |
| 8,038,479 B2 | 10/2011 | Searfass |
| 8,044,130 B2 | 10/2011 | Miyamoto et al. |
| 8,221,541 B2 | 7/2012 | Koh et al. |
| 8,278,010 B2 | 10/2012 | Kim |
| 8,317,917 B2 | 11/2012 | Arockiadoss |
| 8,337,612 B2 | 12/2012 | Abdullah et al. |
| 8,351,220 B2 | 1/2013 | Liang et al. |
| 8,363,873 B2 | 1/2013 | Liu et al. |
| 8,420,940 B2 | 4/2013 | Iwasaki et al. |
| 8,425,717 B2 | 4/2013 | Wagh et al. |
| 8,426,501 B1 | 4/2013 | Taha et al. |
| 8,445,788 B1 | 5/2013 | Tsotsis et al. |
| 8,520,406 B2 | 8/2013 | Liang et al. |
| 8,551,243 B2 | 10/2013 | Soto Montoya et al. |
| 8,580,029 B2 | 11/2013 | Abdullah et al. |
| 8,585,864 B2 | 11/2013 | Zhang et al. |
| 8,586,665 B2 | 11/2013 | Basfar et al. |
| 8,648,129 B2 | 2/2014 | Binhussain et al. |
| 8,658,902 B2 | 2/2014 | Kim et al. |
| 8,669,303 B2 | 3/2014 | Binhussain et al. |
| 8,703,288 B2 | 4/2014 | Clancy |
| 8,853,540 B2 | 10/2014 | Adriaenssens |
| 2002/0014051 A1 | 2/2002 | Fraval et al. |
| 2003/0094734 A1 | 5/2003 | Deckard et al. |
| 2004/0096663 A1 | 5/2004 | Yamaguchi et al. |
| 2004/0241440 A1 | 12/2004 | Noguchi et al. |
| 2004/0265210 A1 | 12/2004 | Shinohara et al. |
| 2005/0109242 A1 | 5/2005 | Kayali et al. |
| 2006/0029537 A1 | 2/2006 | Zhang et al. |
| 2006/0057742 A1 | 3/2006 | Mano et al. |
| 2007/0057415 A1 | 3/2007 | Katagiri et al. |
| 2007/0149677 A1 | 6/2007 | Huang et al. |
| 2007/0149680 A1 | 6/2007 | Kim et al. |
| 2007/0155883 A1 | 7/2007 | Sato et al. |
| 2007/0172408 A1* | 7/2007 | Takagi ............... 423/445 R |
| 2007/0259462 A1 | 11/2007 | Liang |
| 2008/0023404 A1 | 1/2008 | Majersky |
| 2008/0170982 A1 | 7/2008 | Zhang et al. |
| 2008/0176978 A1 | 7/2008 | Nodera |
| 2008/0251273 A1 | 10/2008 | Brown et al. |
| 2008/0257222 A1 | 10/2008 | Wallner |
| 2009/0013907 A1 | 1/2009 | Boxley et al. |
| 2009/0020311 A1 | 1/2009 | Park et al. |
| 2009/0057009 A1 | 3/2009 | Sato |
| 2009/0090277 A1 | 4/2009 | Joshi et al. |
| 2009/0090536 A1 | 4/2009 | Park et al. |
| 2009/0148637 A1 | 6/2009 | Zhang et al. |
| 2009/0197991 A1 | 8/2009 | Bury et al. |
| 2009/0229494 A1 | 9/2009 | Shah et al. |
| 2009/0250660 A1 | 10/2009 | Nayak et al. |
| 2009/0253836 A1 | 10/2009 | Flat et al. |
| 2009/0301751 A1 | 12/2009 | Iwasaki et al. |
| 2010/0147549 A1 | 6/2010 | Shiina |
| 2010/0273912 A1 | 10/2010 | Roddy et al. |

(56) References Cited

U.S. PATENT DOCUMENTS

| | | |
|---|---|---|
| 2010/0278715 A1 | 11/2010 | Khe |
| 2010/0282489 A1 | 11/2010 | Cree et al. |
| 2010/0311867 A1 | 12/2010 | Kim |
| 2011/0107942 A1 | 5/2011 | Eleto Da Silva et al. |
| 2011/0144244 A1 | 6/2011 | Lee |
| 2011/0198105 A1 | 8/2011 | Shanai et al. |
| 2011/0210282 A1 | 9/2011 | Foley |
| 2011/0290153 A1 | 12/2011 | Abdullah et al. |
| 2012/0000691 A1 | 1/2012 | Shah et al. |
| 2012/0024196 A1 | 2/2012 | Gong et al. |
| 2012/0037043 A1 | 2/2012 | Zubrod |
| 2012/0125656 A1 | 5/2012 | Wei et al. |
| 2012/0156381 A1 | 6/2012 | Allouche et al. |
| 2012/0318557 A1 | 12/2012 | Iwasaki et al. |
| 2013/0104775 A1 | 5/2013 | Binhussain et al. |
| 2013/0105195 A1 | 5/2013 | Adriaenssens |
| 2013/0112115 A1 | 5/2013 | Sotillo et al. |
| 2013/0178572 A1 | 7/2013 | Basfar et al. |
| 2013/0276674 A1 | 10/2013 | Korzhenko et al. |
| 2014/0060388 A1 | 3/2014 | Sadiq et al. |
| 2014/0060392 A1 | 3/2014 | Koenigstein |
| 2014/0123880 A1 | 5/2014 | Binhussain et al. |
| 2014/0131096 A1 | 5/2014 | Silverman et al. |

FOREIGN PATENT DOCUMENTS

| | | | |
|---|---|---|---|
| CN | 101481853 | A | 7/2009 |
| CN | 101767482 | A | 7/2010 |
| CN | 101979798 | A | 2/2011 |
| CN | 102603236 | A | 7/2012 |
| CN | 102617087 | A | 8/2012 |
| CN | 102884018 | A | 1/2013 |
| CN | 103534205 | A | 1/2014 |
| EP | 0054424 | A2 | 6/1982 |
| EP | 0190039 | A2 | 8/1986 |
| EP | 0393813 | A1 | 10/1990 |
| EP | 0871181 | A1 | 10/1998 |
| EP | 0966746 | B1 | 12/2004 |
| EP | 1685190 | A1 | 8/2006 |
| EP | 1155080 | B1 | 2/2007 |
| EP | 1777258 | A1 | 4/2007 |
| EP | 1911885 | A2 | 4/2008 |
| EP | 1918249 | A1 | 5/2008 |
| EP | 2022886 | A1 | 2/2009 |
| EP | 2028662 | A2 | 2/2009 |
| EP | 2360699 | A2 | 8/2011 |
| EP | 2447230 | A2 | 5/2012 |
| EP | 2484651 | A2 | 8/2012 |
| EP | 2197949 | B1 | 5/2014 |
| KR | 20030043291 | A | 6/2003 |
| KR | 20060087284 | A | 8/2006 |
| KR | 20060087831 | A | 8/2006 |
| WO | 9319118 | A2 | 9/1993 |
| WO | 0145932 | A1 | 6/2001 |
| WO | 0145941 | A2 | 6/2001 |
| WO | 0224598 | A2 | 3/2002 |
| WO | 03025305 | A1 | 3/2003 |
| WO | 03060002 | A1 | 7/2003 |
| WO | 2006047000 | A2 | 5/2006 |
| WO | 2006076728 | A2 | 7/2006 |
| WO | 2007015710 | A2 | 2/2007 |
| WO | 2007044889 | A2 | 4/2007 |
| WO | 2008041965 | A2 | 4/2008 |
| WO | 2008054034 | A1 | 5/2008 |
| WO | 2009119942 | A1 | 10/2009 |
| WO | 2009137722 | A1 | 11/2009 |
| WO | 2010085537 | A2 | 7/2010 |
| WO | 2010102732 | A1 | 9/2010 |
| WO | 2010142362 | A1 | 12/2010 |
| WO | 2012115500 | A1 | 8/2012 |
| WO | 2012151027 | A1 | 11/2012 |
| WO | 2012167926 | A1 | 12/2012 |
| WO | 2013045936 | A1 | 4/2013 |
| WO | 2013096990 | A1 | 7/2013 |
| WO | 2013105740 | A1 | 7/2013 |
| WO | 2013127444 | A1 | 9/2013 |
| WO | 2014052757 | A1 | 4/2014 |

OTHER PUBLICATIONS

"Carbon Nanotubes and Carbon Nanofibers for Enhancing the Mechanical Properties of Nanocomposite Cementitious Materials", Jul. 15,2011, by Bryan M. Tyson et al. (pp. 8) http://cedb.asce.org/cgi/WWWdisplay.cgi?280661

"Carbon Nanofiber Concrete for Damage Detection of Infrastructure", 2013, by Y.L. Mo et al., (pp. 20) http://www.intechopen.com/books/advances-in-nanofibers/carbon-nanofiber-concrete-for-damage-detection-of-infrastructure.

"Distribution of Carbon Nanofibers and Nanotubes in Cementitious Composites", by Ardavan Yazdanbakhsh et al., (pp. 7) http://abualrub.faculty.masdar.ac.ae/files/Publications/Paper%2030.pdf.

"Nanotechnology: Advantages and drawbacks in the field of construction and building materials", University of Minho, C-TAC Research Unit, Portugal, May 13, 2010, by F. Pacheco-Torgal et al., (p. 1) htpp://www.scienecedirect.com/science/article/pii/S0950061810003764.

"The influences of admixtures on the dispersion, workability, and strength of carbon nanotube—OPC paste mixtures", Cement and Concrete Composites, vol. 34, Issue 2, Feb. 2012, by Frank Collins et al., (pp. 7) http://www.sciencedirect.com/science/article/pii/S0958946511001703

"Environmental-friendly durable concrete made with recycled materials for sustainable concrete construction", University of Wisconsin-Milwaukee, by T.R. Naik et al., (pp. 13) https://www4.uwm.edu/cbu/Coventry/Naiefd.pdf.

"New Eco-Friendly Hybrid Composite Materials for Civil Construction", University of Minho, Portugal, by R. Eiresl et al., (pp.9) http://www.archives.hempembassy.net/hempe/resources/Art.%20Rute%20Eires%20Fran%E7a%20Agosto06.pdf.

"The greening of the concrete industry",Cement and Concrete Composites, vol. 31, Issue 8, Columbia University, New York, by C. Meyer, Sep. 8,2009, (pp. 5) http://www.sciencedirect.com/science/article/pii/S0958946509000031.

"New flame retardant halogen-free cables for nuclear power plants", World Wide Science.org, IAEA / INIS, 1980 by H. Harbort (p. 1) https://inis.iaea.org/search/search.aspx?orig_q=RN:13708694.

"Development of new radiation-resistant and flame-retardant cable", World Wide Science.org, IAEA / INIS, 1982 by Hagiwara et al. (p. 1) https://inis.iaea.org/search/search.aspx?orig_q=RN:15028505.

"Ethylene vinyl acetate/layered silicate nanocomposites prepared by a surfactant-free method: Enhanced flame retardant and mechanical properties", ScienceDirect, vol. 50, Issue 15,17 Jul. 2009 by Yaru Shi et al. (p. 1) http://www.sciencedirect.com/science/article/pii/S003238610900490X.

"LS Cable becomes the second in the world to develop an environment-friendly distribution cable", LS Cables and System, Nov. 23, 2010 (pp. 2) http://www.thecabledirectory.com/ls+cable+became+the+second+in+the+world+to+develop+an+environment-friendly+distribution+cable 30159.html.

"Cable Material Design Criteria for the Medical Industry", Bioconnect, by Floyd Henry (pp. 10) http://www.biocables.com/pdf/wp-CableMaterial.pdf.

"Polymer Coating of Carbon Nanotube Fibers for Electric Microcables", Nanomaterials, 4 Nov. 2014 by Noe T. Alvarez et al. (pp. 12) http://www.mdpi.com/2079-4991/4/4/879.

"Carbon Nanotubes as a New Class of Flame Retardants for Polymers", Kabelwerk EUPEN AG, 2004 by Dr. Gunter Beyer (pp. 5) http://www.eupen.com/weimages/Publications/Carbon_Nanotubes_New_Cless_FR_Polymers.pdf.

* cited by examiner

| EXAMPLE | | 1 310 | 2 320 | 3 330 | 4к 340 | 5 350 | 6 360 |
|---|---|---|---|---|---|---|---|
| COMPOSITION FORMULATION, MASS% 315 | CEMENT | 23 | 23 | 23 | 23 | 23 | 23 |
| | SAND | 68.66 | 68.65 | 68.55 | 68.67 | 68.65 | 68.65 |
| | CARBON NANOMATERIAL 102 | 0.012 | 0.023 | 0.12 | 0 | 0.023 | 0.023 |
| | PLASTICIZER | 0.07 | 0.07 | 0.07 | 0.07 | 0.07 | 0.07 |
| | WATER | 8.26 | 8.26 | 8.26 | 8.26 | 8.26 | 8.26 |
| | DISPERSION TIME (MINUTES) 355 | 3 | 3 | 3 | 3 | 0.5 | 5 |
| TENSILE STRENGTH AT 325 | | 12.8 | 15.6 | 12.1 | 11.9 | 11.2 | 15.5 |
| COMPRESSION STRENGTH, Mpa 345 | | 75.7 | 83.6 | 65.6 | 67.4 | 67.3 | 83.7 |

TABLE 300

FIGURE 3

COMPOSITION FOR CONSTRUCTION MATERIALS MANUFACTURING AND THE METHOD OF ITS PRODUCTION

CLAIM OF PRIORITY

This application is a divisional application of U.S. patent application Ser. No. 13/287,082 titled COMPOSITION FOR CONSTRUCTION MATERIALS MANUFACTURING AND THE METHOD OF ITS PRODUCTION filed on Nov. 1, 2011.

FIELD OF TECHNOLOGY

This disclosure relates generally to the technical fields of construction materials manufacturing with carbon nanomaterials and, in one example embodiment, to a system and method of efficiently manufacturing construction materials with carbon nanomaterials.

BACKGROUND

Construction materials may have a wide range of applications. They may have mineral binding agents and can find application in the construction materials industry during the manufacturing of block and cast-in-place concrete, fibrous concrete, polymer cement mortars, dry mortars and concrete mixes, foam concrete, as well as slates, plastering, finishing and protective coatings. Construction materials may require binding agents to improve a set of physical and mechanical characteristics. Construction materials with high tensile strength may have complex chemical compositions and may be difficult to manufacture on a large scale. The chemical composition may be complex and may require a lot of time and may be expensive to manufacture. Construction materials may require high tensile strength, but may be difficult to manufacture in a cost efficient manner. Construction materials having higher tensile strength may employ expensive and complicated compositions and may be difficult to manufacture on a large scale.

SUMMARY

Disclosed are a system and a method of efficiently manufacturing construction materials with carbon nanomaterials. In one or more embodiments a composition to be used in manufacturing construction materials may comprise a cement binding agent, a sand, a plasticizer, a blend of at least one of a carbon nanofiber, a carbon nanotube, a graphite nanoparticle and an amorphous carbon and a water.

In another aspect, a method may comprise creating a blend of at least one of a carbon nanofiber, a carbon nanotube, a graphite nanoparticle and an amorphous carbon. The method further comprises dispersing the blend of the at least one of the carbon nanofiber, the carbon nanotube, the graphite nanoparticle and the amorphous carbon to form a dispersed mixture. The method also comprises adding a plasticizer and a sand to the dispersed mixture within 3 minutes. The method also comprises adding at least one of a water and a cement binding agent to the dispersed mixture after the plasticizer and the sand have been added.

In yet another aspect, the method comprises creating a blend of a carbon nanomaterial. The blend of the carbon nanomaterial may be obtained by treating an untreated gas mixture with a high voltage discharge plasma in a zone between a cathode and an anode to create a treated gas mixture, releasing the treated gas mixture in a deposition chamber through an opening of the anode and collecting the deposited carbon nanomaterial. The method further comprises adding a plasticizer and a sand to the dispersed mixture within 3 minutes. The method also includes adding at least one of a water and a cement binding agent to the dispersed mixture after the plasticizer and the sand have been added.

BRIEF DESCRIPTION OF THE DRAWINGS

Example embodiments are illustrated by way of example and not limitation in the figures of the accompanying drawings, in which like references indicate similar elements and in which:

FIG. 3 is a graphical process flow diagram illustrating a method of cleaning a deposited carbon nanomaterial using a plurality of cleaner blades, according to one or more embodiments.

Other features of the present embodiments will be apparent from the accompanying Drawings and from the Detailed Description that follows.

DETAILED DESCRIPTION

Disclosed are a system, a method and/or a composition of increased efficiency in carbon nanomaterial synthesis. It will be appreciated that the various embodiments discussed herein need not necessary belong to the same group of exemplary embodiments; and may be grouped into various other embodiments not explicitly disclosed herein. In the following description, for the purpose of explanation, numerous specific details are set forth in order to provide a thorough understanding of various embodiments.

In one or more embodiments, the use of carbon nanomaterials in the composition of cementitious materials may have multiple applications in the construction industry. The composition may be used to manufacture block and cast-in-place concrete, fibrous concrete, polymer cement mortars, dry mortars, concrete mixes, foam concrete, as well as slates, plastering, finishing and protective coatings.

In one or more embodiments, typical construction materials only consisting of cement, sand and water may possess insufficient strength indices. In one or more embodiments, carbon nanomaterials may be used as an additive in the composition of construction materials to increase the strength of the construction materials. In one or more embodiments, the addition of carbon nanomaterials to the cement may increase a set of physical and mechanical characteristics associated with the construction materials. In one or more embodiments, the use of carbon nanomaterials may also lower a power consumption and cost associated with a production of the construction materials and may also simplify the entire process of producing the construction materials.

Figure 1:
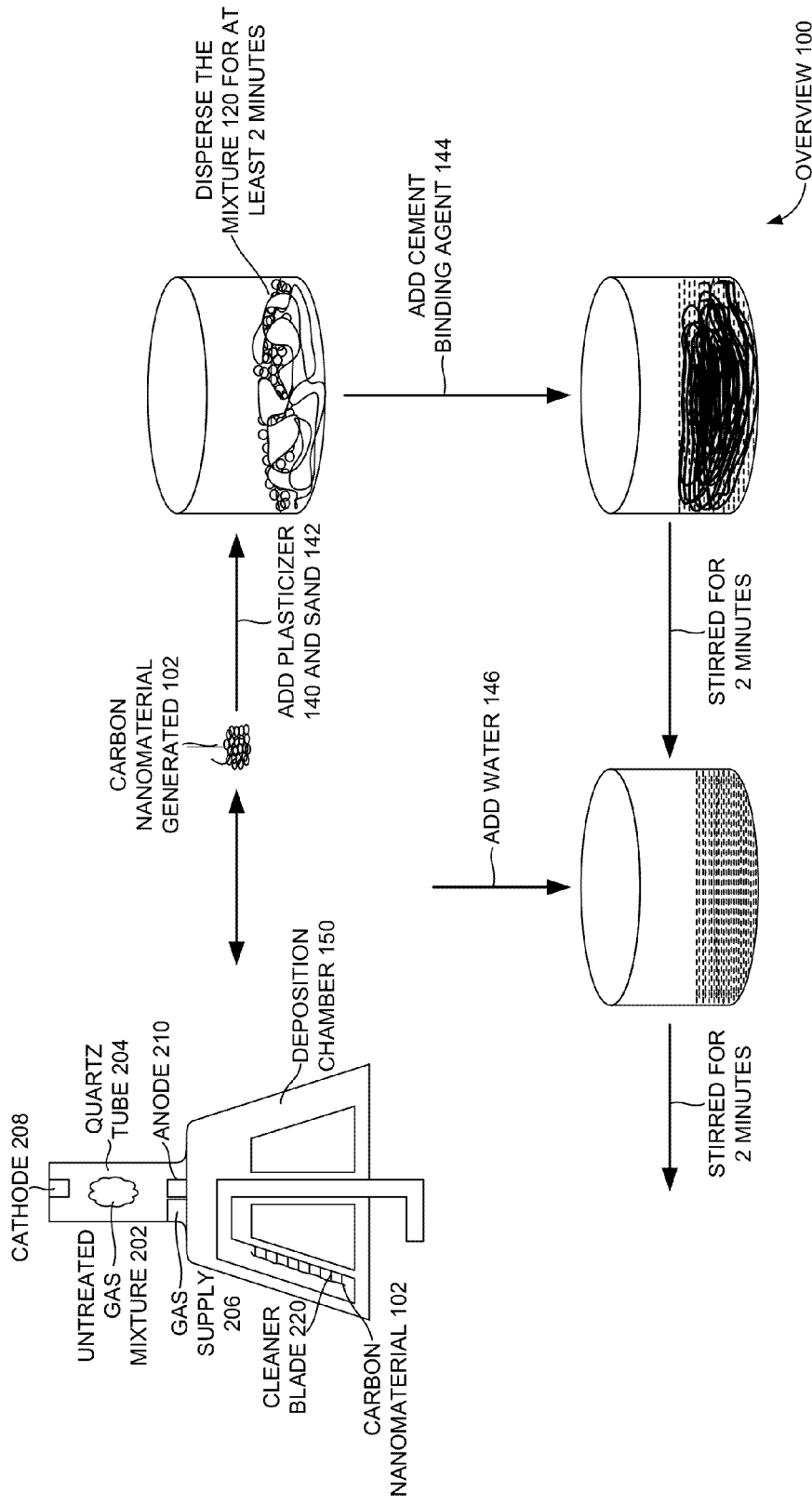
FIG. 1 is a diagram illustrating the steps in the manufacture of the construction materials using carbon nanomaterials.

FIG. 1 is a diagram illustrating the steps in the manufacture of the construction materials using carbon nanomaterials. It depicts the deposition chamber 150, the carbon nanomaterial 102, dispersing the mixture 120, the plasticizer 140, the sand 142, the cement binding agent 144 and the water 146.

Figure 2:
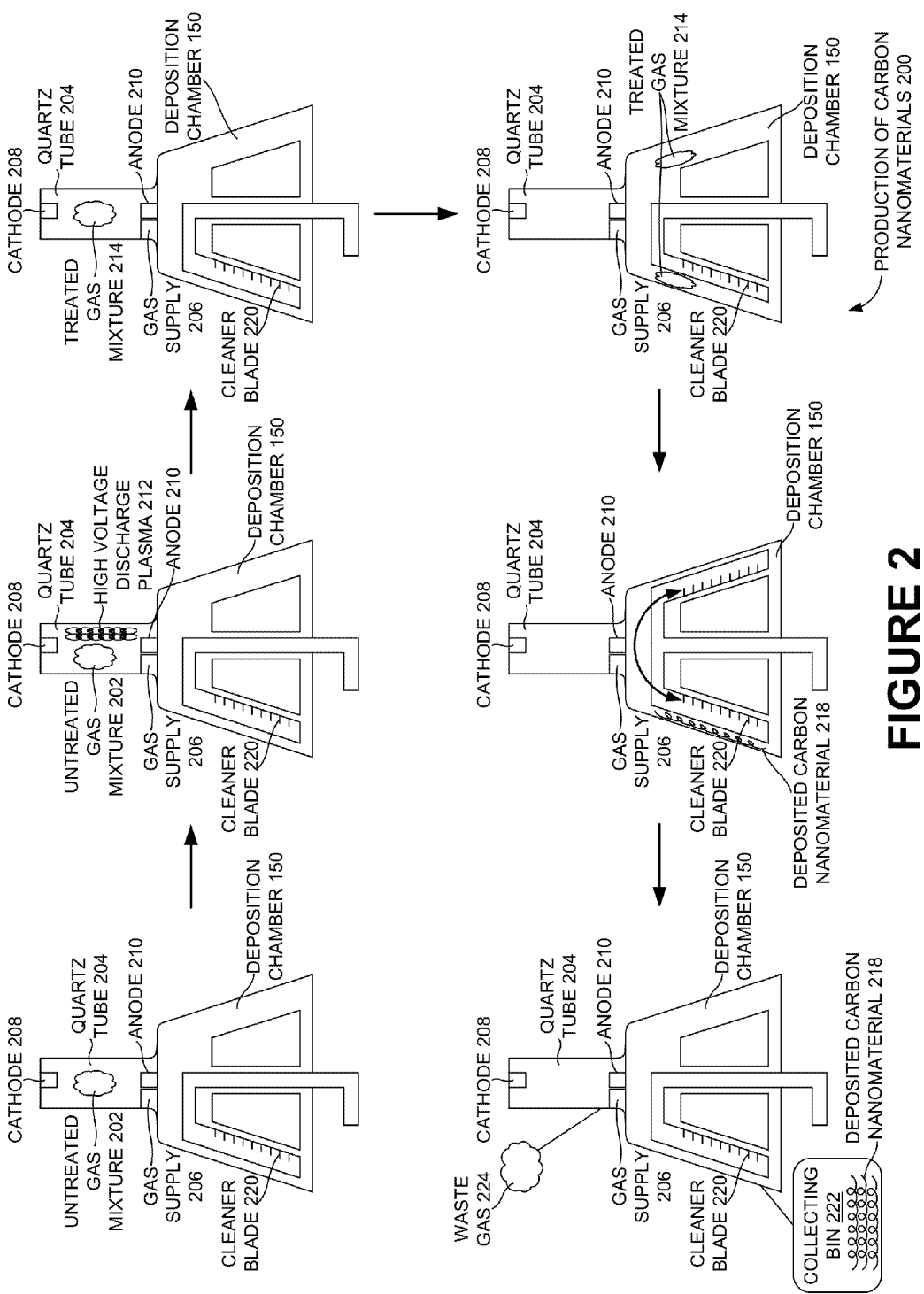
FIG. 2 is a diagram illustrating a setup for a system and method of carbon nanomaterial synthesis with automated collection of a deposited carbon nanomaterial, according to one or more embodiments.

In one or more embodiments, the deposition chamber may generate the carbon nanomaterials 102 (FIG. 1). In one or more embodiments, the carbon nanomaterials may be automatically collected from the deposition chamber 150. In one or more embodiments, the carbon nanomaterials may be a blend of at least one of a carbon nanofiber, a carbon nanotube, a graphite nanoparticle and an amorphous carbon. As illustrated in FIG. 1, the carbon nanomaterial, which may be a blend of at least one of a carbon nanofiber, a carbon nanotube, a graphite nanoparticle and an amorphous carbon, may be collected from a deposition chamber 150. FIG. 2 illustrates the process of producing the carbon nanomaterials with the use of the deposition chamber 150.

In one or more embodiments, the carbon nanomaterials may be dispersed to form a dispersed mixture 110. In one or more embodiments, the carbon nanomaterials are generated during gaseous hydrocarbons decomposition in atmospheric-pressure high voltage plasma as discussed below. In one or more embodiments, using the carbon nanomaterials may allow dispersing by first simultaneously stifling the sand and the plasticizer in a carbon nanomaterials stirrer. This may be done without using complex and expensive equipment like an ultrasonic disperser. During such mixing, sand particles making fragmentation of sintered carbon nanomaterials into smaller particles, thereby distributing them at the same time into the sand mixture, in one or more embodiments. In one or more embodiments, dispersion refers to decomposing the carbon nanomaterials into smaller particles. In one or more embodiments, the carbon nanomaterials may be dispersed using an ultrasonic disperser. In one or more embodiments, the plasticizer and sand may be introduced into the mixture and may be stirred for at least 3 minutes. After the dispersed mixture has been stirred in with the plasticizer and the sand, the cement binding agent is added to the mixture and stirred for at least 2 minutes. The water is then added to the new mixture with the cement binding agent and then stirred for another additional 2 minutes.

FIG. 2 is a graphical process flow diagram illustrating a method for the automated collection of the carbon nanomaterial. It illustrates the cathode 208, the untreated gas mixture 202, the quartz tube 204, the anode 210, the gas supply 206, the cleaner blade 220, the deposition chamber 150, the high voltage discharge plasma 212, the treated gas mixture 214, the waste gas 224, the deposited carbon nanomaterial 218 and the collecting bin 222.

In one or more embodiments, the presence of an untreated gas mixture 202 may be detected when the untreated gas mixture 202 is fed into a quartz tube 204 through a gas supply 206. The quartz tube 204 may comprise a cathode 208 and an anode 210 in one or more embodiments. In one or more embodiments, the untreated gas mixture 202 may be treated by a high-voltage discharge plasma 212 in the quartz tube 204 in the zone between the cathode and the anode 210 to create a treated gas mixture 214.

In one or more embodiments, the treated gas mixture 214 may be released in a deposition chamber 150 through an opening of the anode 210. A deposited carbon nanomaterial 218 may be deposited in the deposition chamber 150 in one or more embodiments. In one or more embodiments, the deposited carbon nanomaterial 218 may be a multi-walled or single walled carbon nanotube, a carbon nanofiber or a nanographite particle. In one or more embodiments, the carbon nanofiber may be a cylindrical structure with graphene layers stacked as cones, cups or plates. Graphene is an allotrope of carbon and stacked sheets of graphene may form graphite.

In one or more embodiments, carbon nanofibers that are perfect cylinders may be called carbon nanotubes. In one or more embodiments, carbon nanomaterials may exhibit extraordinary strength and unique electrical properties and may be good thermal conductors. In one or more embodiments, multi-walled carbon nanotubes may comprise multiple layers, such as concentric rolled cylinders of graphite. In one or more embodiments single walled carbon nanotubes comprise just a single layer of graphene. In one or more embodiments, a single wall carbon nanotube may be one nanometers in diameter but hundreds (or even millions) of nanometers in length.

In one or more embodiments, carbon nanotubes are one of the strongest materials known in terms of tensile strength. In one or more embodiments, tensile strength is a measure of stress a material can withstand while being pulled or stretched apart. In one or more embodiments, the carbon nanotubes may also be the stiffest materials known in terms of elastic modulus. In one or more embodiments, the elastic modulus is a description of a material's tendency to deform elastically or non-permanently, when a force is applied to it. Young's modulus may describe a form of elasticity known as tensile elasticity, also known as an object's tendency to deform along an axis when opposing forces are applied along that axis. In one or more embodiments, carbon nanotubes may have a Young's modulus that is about 5 times greater than that of steel. In one or more embodiments, carbon nanotubes may also be very lightweight and may have high thermal conductivity.

In one or more embodiments, the deposited carbon nanomaterial 218 may be used to develop polymer nanocomposites. In one or more embodiments, the nanocomposite may be a multiphase material wherein one phase has a dimension of less than 100 nanometers. A polymer nanocomposite may be a polymer or copolymer having dispersed in its nanoparticles in one or more embodiments. In one or more embodiments, polymer nanocomposites may be strong and may have unique thermal and electrical properties.

In one or more embodiments, the deposited carbon nanomaterial 218 may be cleaned using a plurality of cleaner blades 220. In one or more embodiments, the deposited carbon nanomaterial 218 may be sent to a collecting bin 222 coupled to the deposition chamber 150. In one or more embodiments, a waste gas 224 may also be released.

FIG. 3 depicts a table illustrating various experiments and quantities of the composition for the construction material. FIG. 3 depicts six experiments (310, 320, 330, 340, 350 AND 360) that used varying quantities in mass percent 315 of the cement binding agent, the sand, the carbon nanomaterial, the plasticizer and the water. It also shows the dispersion time 355 of the mixture, the tensile strength as tested 325, the bending MPa 335 and compression strength in MPa 345.

In the first experiment 310, 5 kg of Portland cement binding agent was used as a cementitious agent and 15 kg of fine aggregate in the form of quartz sand was used. The cement binding agent comprised 23% in mass and the sand comprised 68.66% in mass. First, 0.0025 kg (0.012 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 12.8 and the compression strength was 75.7.

In the second experiment 320, 5 kg of Portland cement binding agent was used as a cementitious agent and 15 kg of fine aggregate in the form of quartz sand was used. The cement binding agent comprised 23% in mass and the sand comprised 68.66% in mass. First, 0.005 kg (0.023 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 15.6 and the compression strength was 83.6.

In the third experiment 330, 5 kg of Portland cement binding agent was used as a cementitious agent and 15 kg of fine aggregate in the form of quartz sand was used. The cement binding agent comprised 23% in mass and the sand comprised 68.66% in mass. First, 0.025 kg (0.12 mass percent) of the carbon nanomaterial was used and dispersed. 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 12.1 and the compression strength was 65.6.

In the fourth experiment 340, 5 kg of Portland cement binding agent was used as a cementitious agent and 15 kg of fine aggregate in the form of quartz sand was used. The cement binding agent comprised 23% in mass and the sand comprised 68.66% in mass. First, 0.015 kg (0.07 mass percent) of plasticizer Sica Viscocrete was added to the sand and dispersed into the mixer within 3 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 11.9 and the compression strength was 67.4.

In the fifth experiment 350, 5 kg of Portland cement binding agent was used as a cementitious agent and 15 kg of fine aggregate in the form of quartz sand was used. The cement binding agent comprised 23% in mass and the sand comprised 68.66% in mass. First, 0.005 kg (0.023 mass percent) was used and dispersed. 0.015 kg (0.07 mass percent) of plasticizer Sica Viscocrete was added to the sand and dispersed into the mixer within 0.5 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 11.2 and the compression strength was 67.3.

In the sixth experiment 360, 5 kg of Portland cement binding agent was used as a cementitious agent and 15 kg of fine aggregate in the form of quartz sand was used. The cement binding agent comprised 23% in mass and the sand comprised 68.66% in mass. First 0.005 kg (0.023 mass percent) of carbon nanomaterial was used and dispersed. 0.015 kg (0.07 mass percent) of plasticizer Sica Viscocrete was added to the sand and dispersed into the mixer within 5 minutes. The cement was introduced into the mixture of sand, carbon nanomaterial and plasticizer and was additionally stirred for 2 minutes. At slow stirring, 1.8 kg of water was then added to the mortar. The mortar was stirred for another 2 minutes, put into molds of 40×40×160 mm and compact on the table vibrator was 2 minutes. The makeup hardened for 28 days and nights at normal conditions. The tensile strength was 15.5 and the compression strength was 83.7

In one or more embodiments, adding the carbon nanomaterial increased tensile strength at bending by 31% and compression strength by 24%.

Figure 4:
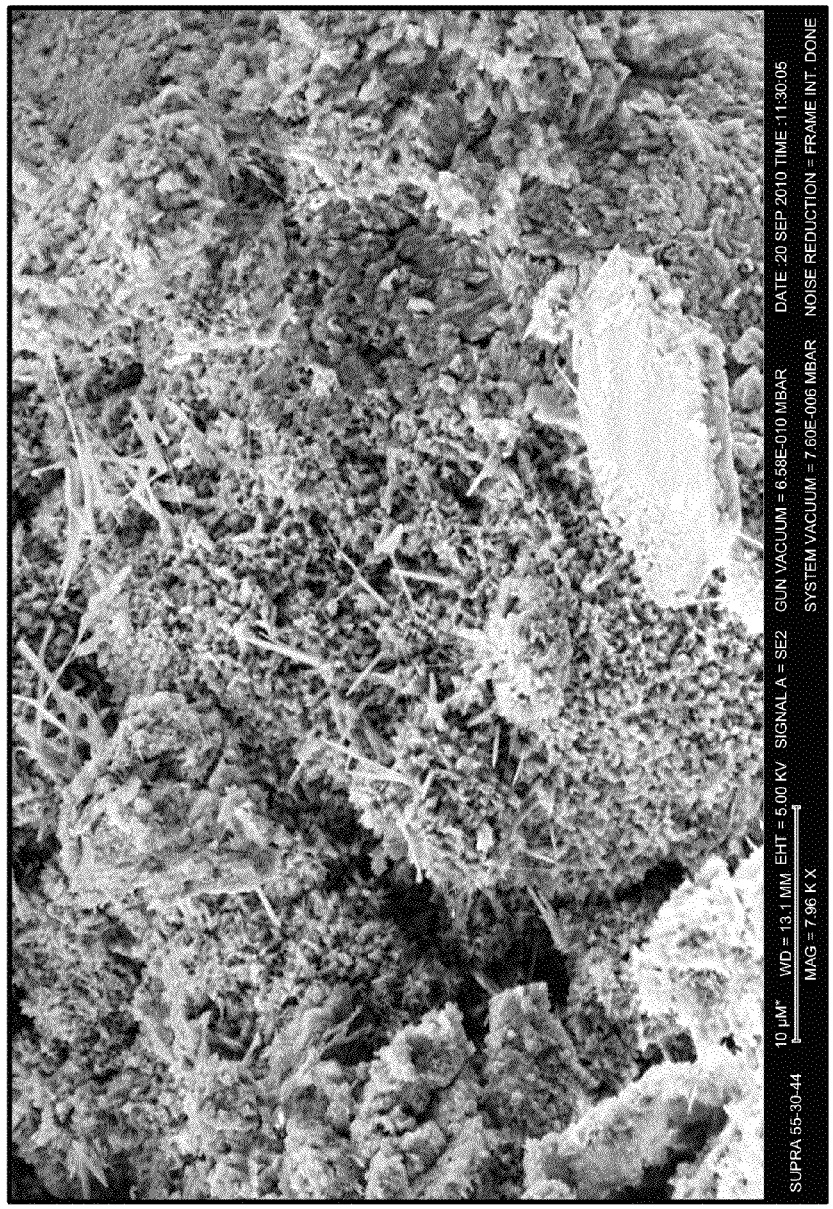
FIG. 4 is a process flow diagram illustrating a method of increasing efficiency in carbon nanomaterial synthesis, according to one or more embodiments.

FIG. 4 shows an electron microscopic structure of the concrete with carbon nanomaterials.

Figure 5:
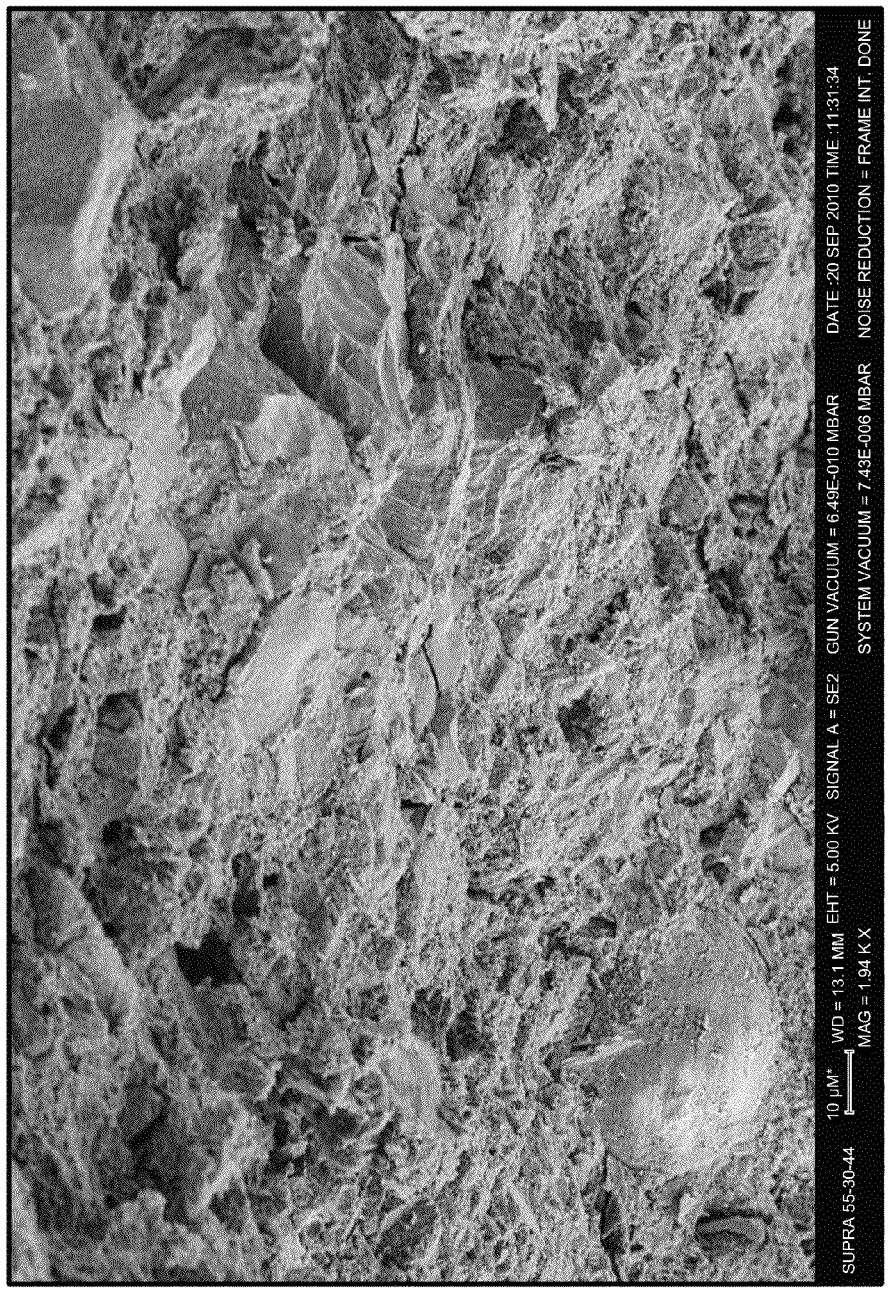
FIG. 5 is a process flow diagram illustrating another method of efficient carbon nanomaterial synthesis, according to one or more embodiments.

FIG. 5 shows an electron microscopic structure of the concrete without carbon nanomaterials.

Although the present embodiments have been described with reference to specific example embodiments, it will be evident that various modification and changes may be made to these embodiments without departing from the broader spirit and scope of the various embodiments. Accordingly, the specification and drawings are to be regarded in an illustrative rather than a restrictive sense.

What is claimed is:

1. A method comprising:
    creating a 0.0125% to 1% by mass percentage blend of carbon nanomaterials, wherein the blend of carbon nanomaterials includes carbon nanotubes;
    dispersing the blend of carbon nanomaterials to form a dispersed mixture;
    adding 0.05-1% by mass percentage of a plasticizer and 5-50% by mass percentage of sand to the dispersed mixture within 3 minutes; and
    adding 15-55% by mass percentage of a cement binding agent and a remaining mass percentage of water to the dispersed mixture after the addition of the plasticizer and the sand.

2. The method of claim 1, comprising obtaining the blend of carbon nanomaterials through:
    detecting presence of an untreated gas mixture when the untreated gas mixture is fed in a quartz tube through a gas supply;
    treating the untreated gas mixture with high-voltage discharge plasma in a zone between a cathode and an anode to create a treated gas mixture;
    releasing the treated gas mixture in a deposition chamber through an opening of the anode; and
    collecting a deposited carbon nanomaterial used in the blend of carbon nanomaterials automatically with a plurality of cleaner blades.

3. The method of claim 1, wherein a mass percentage of the carbon nanotubes in the blend of carbon nanomaterials ranges from 20-30%.

4. A method comprising:
    creating a 0.0125% to 1% by mass percentage blend of carbon nanomaterials through treating an untreated gas mixture with high-voltage discharge plasma in a zone between a cathode and an anode to create a treated gas mixture, releasing the treated gas mixture in a deposition chamber through an opening of the anode and collecting a deposited carbon nanomaterial;

dispersing the blend of carbon nanomaterials to form a dispersed mixture;

adding 0.05-1% by mass percentage of a plasticizer and 5-50% by mass percentage of sand to the dispersed mixture within 3 minutes; and adding 15-55% by mass percentage of a cement binding agent and a remaining mass percentage of water to the dispersed mixture after the addition of the plasticizer and the sand.

5. The method of claim 4, wherein a mass percentage of the carbon nanotubes in the blend of carbon nanomaterials ranges from 20-30%.

* * * * *